United States Patent [19]

Stahl et al.

[11] Patent Number: 4,509,736
[45] Date of Patent: Apr. 9, 1985

[54] APPARATUS FOR MANIPULATING STACKED X-RAY SHEETS OR THE LIKE

[75] Inventors: Werner Stahl, Kirchheim-Heimstetten; Jürgen Müller, Munich, both of Fed. Rep. of Germany

[73] Assignee: Agfa-Gevaert Aktiengesellschaft, Leverkusen, Fed. Rep. of Germany

[21] Appl. No.: 476,588

[22] Filed: Mar. 18, 1983

[30] Foreign Application Priority Data

Mar. 30, 1982 [DE] Fed. Rep. of Germany ....... 3211609

[51] Int. Cl.³ .............................................. B65H 5/08
[52] U.S. Cl. ....................................... 271/11; 271/20; 271/106; 271/107
[58] Field of Search ................... 271/11, 20, 100, 101, 271/106, 107, 105

[56] References Cited

U.S. PATENT DOCUMENTS

| | | | |
|---|---|---|---|
| 1,148,371 | 7/1915 | Fenlason | 271/107 |
| 1,249,042 | 12/1917 | Dexter | 271/107 X |
| 1,382,951 | 6/1921 | Breen | 271/107 X |
| 3,084,928 | 4/1963 | Opitz | 271/106 X |
| 4,105,198 | 8/1978 | Stievenart | 271/106 X |
| 4,218,054 | 8/1980 | Bauer | 271/106 X |
| 4,420,150 | 12/1983 | Umezawa | 271/107 X |

FOREIGN PATENT DOCUMENTS 975233 10/1961 Fed. Rep. of Germany ...... 271/107
2403469 1/1973 Fed. Rep. of Germany .

Primary Examiner—Richard A. Schacher
Attorney, Agent, or Firm—Peter K. Kontler

[57] ABSTRACT

Apparatus for transferring sheets from a relatively wide or relatively narrow stack of sheets into a transporting device has a pair of suction cups which engage the leader of the topmost sheet in the stack and turn it through 90° so that the leader becomes separated from the leader of the sheet therebelow. The suction cups are thereupon raised to the level of the nips of driven advancing rolls in the transporting device to move the leader into a plane which includes the nips and is parallel to the planes of sheets in the stack, and such leader is introduced into the nips so that the advancing rolls engage the leader while the latter becomes detached from the suction cups. The suction cups engage only a portion of the leader of a relatively wide sheet, and the remainder of the leader is flexed with the engaged portion to ensure that it enters a path which is defined by additional advancing rolls of the transporting device simultaneously with entry of the engaged portion of the leader into the nips of the driven advancing rolls. The apparatus can be used with advantage for removal of successive topmost X-ray films from a stack of films regardless of the width and/or height of the stack. The suction cups descend from the level of the nips to the level of the topmost sheet in the stack as soon as the transfer of the preceding sheet is completed and along a path such that each of a series of successive properly stacked sheets is engaged at the same distance from its leading edge.

39 Claims, 6 Drawing Figures

APPARATUS FOR MANIPULATING STACKED X-RAY SHEETS OR THE LIKE

CROSS-REFERENCE TO RELATED CASE

The apparatus which is disclosed in the present application is related to the apparatus of our commonly owned copending patent application Ser. No. 470,178 filed Feb. 28, 1983 for "Method and apparatus for singularizing stacked X-ray films or the like".

BACKGROUND OF THE INVENTION

The present invention relates to apparatus for manipulating stacked sheets, for example, X-ray films. More particularly, the invention relates to improvements in apparatus for converting a stack of overlapping sheets into a single file of discrete sheets. Still more particularly, the invention relates to improvements in apparatus for predictable singularization of stacked sheets having any one of a wide variety of widths, lengths and/or thicknesses.

It is already known to transfer successive outermost sheets of a stack of overlapping sheets from a first location to a second location where successive sheets enter a transporting device in such orientation that the plane of a sheet entering the transporting device is parallel or nearly parallel to the plane of the outermost sheet in the stack. It is also known to effect the transfer of successive outermost sheets by resort to suction cups which are rotatably mounted on a support and can be caused to perform angular movements under the action of a cam. Reference may be had to German Offenlegungsschrift No. 24 03 369 which discloses an apparatus wherein the suction cups are caused to attract the topmost sheet of a stack and thereupon perform an angular movement (in order to change the plane of the attracted portion of the topmost sheet and to thus separate the topmost sheet from the sheet therebelow) together with an upward movement (such upward movement also contributes to segregation of the topmost sheet from the next-to-the-topmost sheet) prior to reassuming their original orientation in order to move the singularized and partly lifted topmost sheet into a plane that is at least nearly parallel to the plane of the sheet therebelow (i.e., to the plane of the fresh topmost sheet).

A drawback of the just discussed conventional apparatus is that it can be used only for the singularization of sheets having a predetermined length and width. If the format of the sheet is changed, e.g., if a stack of relatively wide sheets is followed by a stack of narrower sheets, at least one of the suction cups does not engage the exposed side of the topmost sheet of the stack so that it draws air from the atmosphere and causes a reduction of suction (i.e., a rise of pressure) in each other suction cup because all of the suction cups are invariably connected to one and the same suction generating device. Furthermore, if the width of the sheets to be manipulated greatly exceeds the distance between the two outermost suction cups, the sheet material which extends laterally beyond the outermost suction cups flexes downwardly by gravity and prevents predictable introduction of the lifted sheet into the transporting device, e.g., into the nip of a pair of advancing rolls between which successive sheets advance on their way to the next processing station, for example, into a cassette for X-ray films. In other words, while the just discussed conventional apparatus is quite satisfactory for the manipulation of sheets having a predetermined format, any change in the format of sheets greatly reduces the reliability and utility of such apparatus and can render the apparatus useless for its intended purpose.

OBJECTS AND SUMMARY OF THE INVENTION

An object of the invention is to provide a highly versatile apparatus which can manipulate wide, narrow, long or short sheets with the same degree of facility and reliability.

Another object of the invention is to provide an apparatus which can properly singularize sheets having any one of a wide variety of formats irrespective of whether the sheets are accumulated into tall or short stacks and irrespective of whether the neighboring sheets exhibit no tendency or a rather pronounced tendency to adhere to one another.

A further object of the invention is to provide an apparatus which is relatively simple, in spite of its pronounced versatility, and which can singularize stacked sheets at any one of a wide range of frequencies.

Another object of the invention is to provide a novel and improved transporting device for reception of sheets from the singularizing mechanism of the improved apparatus.

An additional object of the invention is to provide a novel and improved method of manipulating wide, narrow, long or short sheets between a stack of such sheets and a transporting device which is designed to convey a single file of successive discrete sheets.

Another object of the invention is to provide the apparatus with novel and improved means for moving a plurality of suction-operated lifting elements for individual sheets.

A further object of the invention is to provide the apparatus with novel and improved means for synchronizing the movements of its mobile components to thus ensure predictable transfer of successive outermost sheets from a stack to the transporting device.

An additional object of the invention is to provide an apparatus which can be used as a superior substitute for presently known apparatus which are employed to singularize stacked X-ray films or other types of sheet material.

The invention is embodied in an apparatus for transferring successive sheets of a stack of overlapping sheets having one of a variety of different widths including a minimum width to a transporting device which accepts successive sheets in a first plane. The apparatus is particularly suited for the transfer of X-ray films and comprises a source of sheets which serves to support a stack of sheets so that the outermost sheet of the stack is located in a second plane which is at least substantially parallel to the first plane. Such outermost sheet includes a leader having an exposed side and a width corresponding to one of the aforementioned different widths. The apparatus further comprises a singularizing device which includes a pair of suction-operated lifting elements (i.e., at least two lifting elements) spaced apart from one another by a distance which at most equals the aforementioned minimum width, means for moving the lifting elements into engagement with the exposed side of the leader of the outermost sheet of the stack in the source, and means for guiding or steering the movements of the lifting elements between a first end position in which the lifting elements engage the outermost sheet of the stack (i.e., the sheet which is located in the second plane), a second end position in which the leader of the thus lifted sheet is located in the first plane, and a plurality of intermediate positions in each of which the leader of the outermost sheet is disposed in at least one additional plane which is at least slightly inclined with reference to the first and second planes.

The moving means can comprise means for pivoting the lifting elements about a predetermined axis and the steering means can comprise one or more cams. The first and second planes are preferably horizontal or nearly horizontal, and the orientation of the stack in the source can be such that successive outermost sheets are the topmost sheets of the stack.

The transporting device preferably includes at least one pair of advancing rolls defining a nip which is located in the first plane, and the steering means is operative to effect entry of the leader of the lifted sheet (i.e., of the leader which is located in the first plane) into the nip of the advancing rolls when the lifting elements are held in or close to their second end positions. The transporting device preferably further comprises additional rolls which are staggered relative to one another, as considered in the axial direction of the advancing rolls, to define a path for a portion of a sheet whose width exceeds the distance between the lifting elements.

The additional plane can make an angle of approximately or exactly 90 degrees with the first and second planes. Such first and second planes can be disposed at different levels and the steering means then comprises means for effecting the movement of lifting elements between the levels of the first and second planes while the lifting elements maintain the leader of the lifted sheet in or close to the additional plane. As mentioned above, the first and second planes are or can be at least substantially horizontal, and the second plane is preferably located below the first plane. The steering means can be arranged to effect substantially vertical movements of lifting elements between the levels of the first and second planes.

The moving means can comprise a first carrier, means defining for the first carrier a pivot axis, and a second carrier which is supported by the first carrier for radial movement with reference to the axis of the first carrier under the action of the steering means. The lifting elements are then mounted in the second carrier. One of the carriers can be slidably telescoped into the other carrier. The first carrier can comprise a plurality of elongated rails and the steering means can include cam means for pivoting the rails about the axis of the first carrier. The steering means preferably further comprises additional cam means for moving the second carrier with reference to the rails.

The moving means can further comprise a common support for the lifting elements, and such support defines a pivot axis for the lifting elements. The steering means then comprises means for pivoting the lifting elements about such axis. The pivoting means can comprise crank means which is connected to the support and means for rocking the crank means to thereby pivot the lifting elements about their axis through the medium of the support. The rocking means can comprise cam means. The aforementioned second carrier can comprise two spaced-apart portions, and the support can be mounted in such portions of the second carrier. Preferably, the support is mounted in those ends of the portions of the second carrier which are remote from the axis of the first carrier.

The apparatus preferably further comprises control means for the singularizing device and for the steering means. The singularizing device further comprises a pump or other suitable suction generating means which is activatable to draw air from the suction chambers of the lifting elements, and a valve or other suitable aerating means which is activatable to admit air into the suction chambers and to thus detach the lifting elements from the leader of a sheet. The control means comprises means for activating and deactivating the suction generating means and the aerating means during certain stages of a cycle which involves the transfer of a sheet from the source to the transporting device.

As mentioned above, the steering means for the moving means comprises at least one cam, preferably a rotary cam, and such steering means further comprises motor means for the cam. The control means comprises means for arresting the motor means for a given interval of time in the first end positions of the lifting elements and means for ascertaining the pressure in the suction chambers of the lifting elements during such interval. The control means preferably further comprises means for arresting the motor means for a given interval of time in at least one intermediate position of the lifting elements.

The source may include a tray having a bottom wall with holes in register with the suction chambers of the lifting elements in the first end positions of the lifting elements. This ensures that the control means can ascertain that the supply of sheets in the source is exhausted if the suction chambers of the lifting elements can draw air from the respective holes.

Each lifting element can comprise a deformable bell which defines the respective suction chamber and has a frustoconical external surface provided with a circumferentially extending notch having a preferably triangular outline. This enables a marginal lip of the bell to undergo deformation in response to biasing of the lip against the exposed side of a sheet and to thereby convert a mere linear contact between the lip and the sheet into a surface-to-surface contact.

The steering means preferably further comprises wiper means in the form of cam means adjacent to at least one of the lifting elements and arranged to roll along the exposed side of the outermost sheet during movement of the lifting elements from their first end positions. To this end, the wiper means is preferably formed with a convex sheet-contacting surface which rolls along the exposed side of the outermost sheet of the stack while the lifting elements turn about the axis of the support to move from their first end positions and to thereby flex the leader of the outermost sheet away from the leader of the next sheet.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
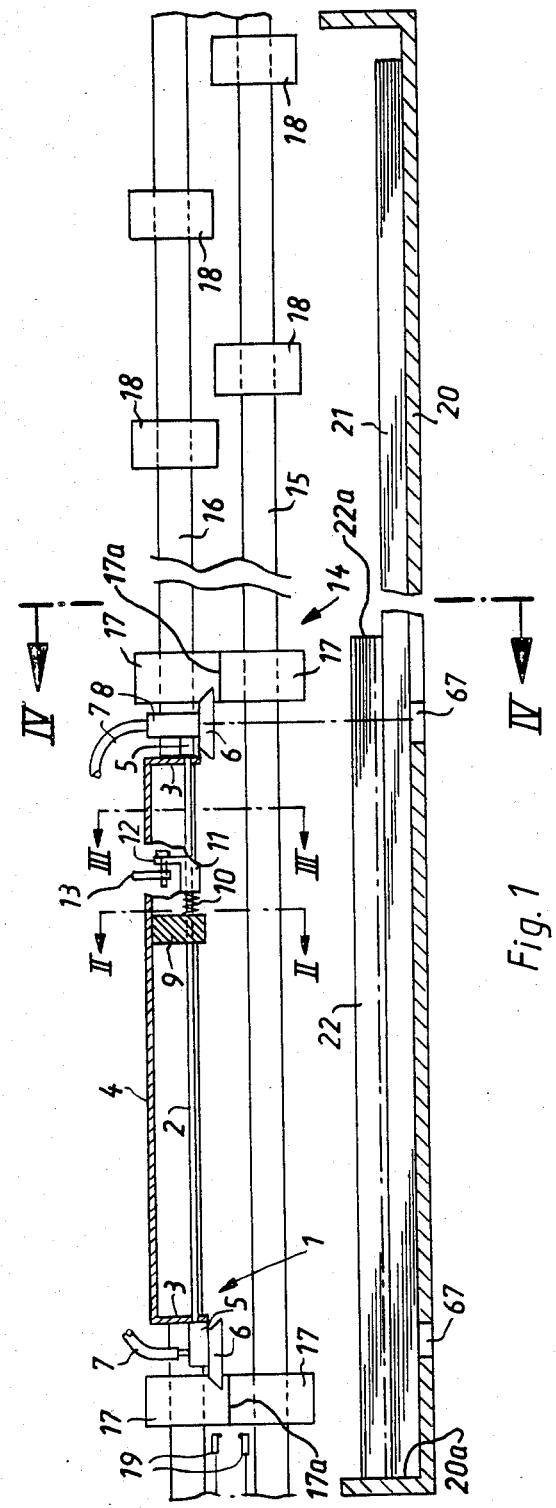
FIG. 1 is a schematic partly rear elevational and partly vertical sectional view of an apparatus which embodies the present invention, a stack of relatively narrow sheets being shown on top of a stack of wider sheets.
Figure 5:
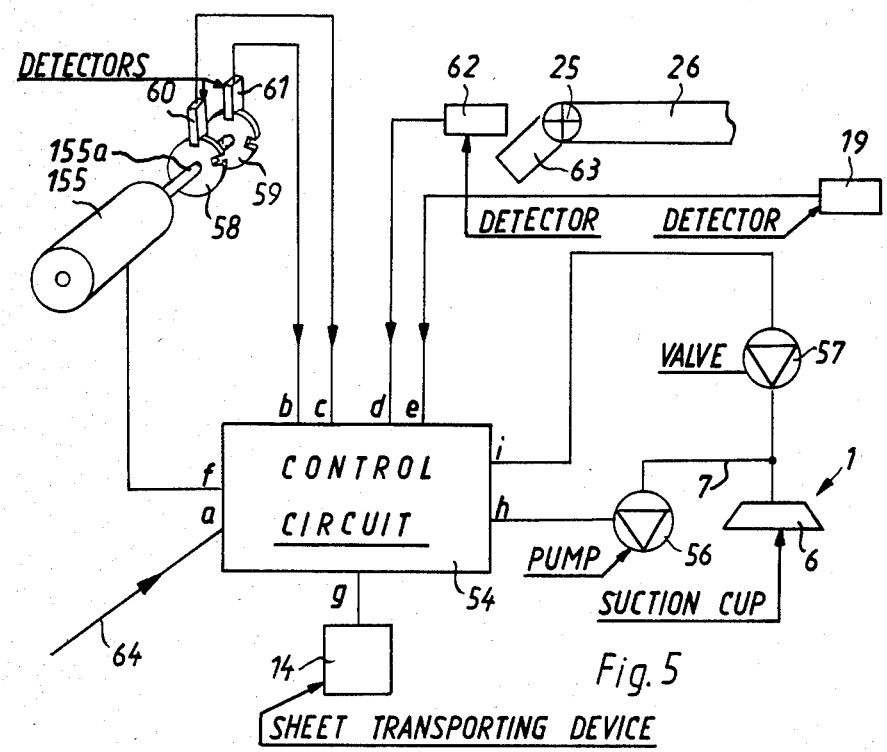
FIG. 5 is a block diagram of the apparatus showing a control unit which synchronizes the movements of various mobile components.

The apparatus which is shown in FIG. 1 comprises two spaced-apart sheet lifting elements 6 in the form of suction cups which constitute component parts of a singularizing device 1. The suction cups 6 are mounted on a transversely extending support 2 (e.g., an elongated rod) which forms part of a means for moving the suction cups 6 between two end positions and through a plurality of intermediate positions. The end portions of the support 2 are rotatably mounted in the outer end portions of the side walls 3 of a holder 4. The tips of the end portions of the support 2 extend beyond the respective side walls 3 and are connected with blocks 5 which mount the respective suction cups 6. When the suction cups 6 are held in their first or second end positions, they are disposed at the undersides of the respective blocks 5. The singularizing device 1 further comprises flexible hoses 7 or other suitable conduit means serving to connect the suction chambers of the cups 6 with a suction generating device 56 (e.g., a suction pump) which is shown in FIG. 5. The blocks 5 further carry cam-shaped wipers 8 of which only one is actually shown in FIG. 1 for the sake of clarity.

An intermediate portion of the support 2 extends through a block-shaped bearing member 9 which is engaged by one leg of a torsion spring 10. The convolutions of the spring 10 surround a portion of the support 2 and its other leg bears against a sleeve 11 forming part of a radially extending crank arm 12. The outer or free end portion of the crank arm 12 is turnably connected with a rocking member here shown as a rod 13 only a portion of which can be seen in FIG. 1. The spring 10 urges the support 2 to a predetermined angular position in which the support is held by a suitable stop (not shown). The support 2 can leave such predetermined angular position under the influence of the pull rod 13 and crank arm 12 which can rotate the support through the medium of the sleeve 11.

FIG. 1 further shows a portion of a transporting device 14 which serves to accept successive sheets from the suction cups 6 and to advance the thus accepted sheets along a horizontal path extending at right angles to the plane of FIG. 1. The transporting device 14 comprises two pairs of driven advancing rolls 17. At least one roll 17 of each pair of advancing rolls is driven by a motor (not shown) so that it can rotate the companion roll 17 in the opposite direction. Consequently, a sheet which enters the nips 17a of the two pairs of advancing rolls 17 is caused to move in a direction to the right (as viewed in FIG. 4) in a horizontal plane which is parallel to the plane of the topmost sheet of a stack 22 of sheets in a tray 20 or another suitable source of overlapping sheets. The upper and lower advancing rolls 17 are respectively mounted on horizontal shafts 16 and 15, and such shafts further carry additional rolls 18 which are coaxial with the respective advancing rolls and are staggered with reference to one another, as considered in the axial direction of the rolls 17. The additional rolls 18 define an extension of the path for advancement of sheets through the nips 17a of the two pairs of driven advancing rolls 17 and are needed if the width of a sheet (note the stack 21 in FIG. 1) greatly or appreciably exceeds the distance between the two suction cups 6 on the support 2.

A sheet monitoring or detecting device 19 is installed adjacent to the nip 17a of one of the two pairs of rolls 17, and the purpose of such monitoring device is to generate a signal on detection of the leader of a sheet which enters the nips 17a and/or to generate a signal when the trailing end of a sheet has been advanced beyond the nips 17a. The monitoring device 19 can comprise a light source at a level above the horizontal plane of the nips 17a and a photoelectronic transducer which is mounted at a level below such plane and is in register with the light source.

FIG. 1 shows that the width of the tray 20 suffices to accommodate a relatively wide stack 21 or a relatively narrow stack 22. The width of the narrowest stack should not be less than the distance between the two suction cups 6, i.e., each of these suction cups should be capable of coming into full contact with the region behind the leading edge of the narrowest sheet therebelow. Preferably, such sheet is held in abutment with the left-hand side wall 20a of the tray 20. It will be noted that the width of sheets forming the stack 22 exceeds the distance between the two suction cups 6 so that the left-hand cup 6 can be lowered into lifting engagement with the leader of the topmost sheet in the stack 22 at a locus which is spaced apart from the side wall 20a (i.e., from the left-hand longitudinal edge face of the stack 22) and that the right-hand cup 6 can engage the topmost sheet of the stack 22 at a certain distance from the right-hand longitudinal marginal portion 22a of the stack 22.

For example, the width of the stack 21 can be twice the width of the stack 22. The additional rolls 18 of the transporting device 14 are desirable in connection with the removal of successive sheets forming part of the wide stack 21; the meandering gap between the upper and lower rows of additional rolls 18 then receives that portion of a wide sheet which extends to the right beyond the right-hand suction cup 6.

The bottom wall of the tray 20 has two holes 67 in line with the respective suction cups 6. The purpose of these holes is to enable a suction- or pressure-responsive signal generating detector to transmit a signal when the suction cups 6 descend and abut against the bottom wall of the tray 20 instead of against the upper side of a sheet. This is indicative of exhaustion of the supply of stacked sheets in the tray 20.

Figure 2:
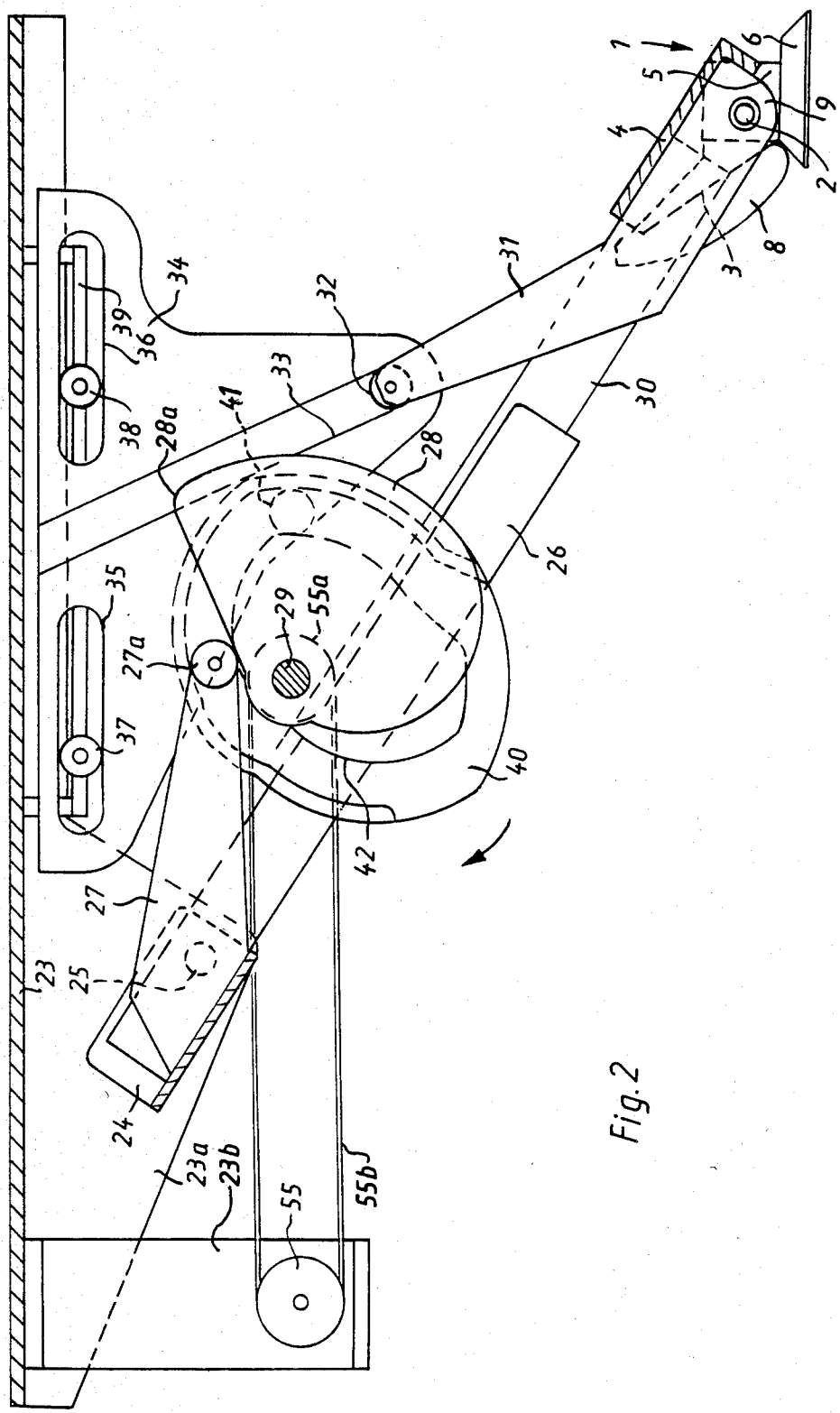
FIG. 2 is an enlarged fragmentary longitudinal vertical sectional view as seen in the direction of arrows from the line II—II of FIG. 1.

Referring to FIG. 2, the reference character 23 denotes a fixed frame which forms part of or is secured to the housing of the apparatus and includes two parallel downwardly extending side walls 23a (only one can be seen in FIG. 2). The side walls 23a support a transversely extending crossbar 24 which is rotatable about the axes of two coaxial pivot members 25 mounted in the respective side walls. The crossbar 24 has a U-shaped cross-sectional outline and supports two elongated rails 26 (only one shown in FIG. 2) as well as a lever 27 which is disposed between the rails 26 and carries a roller follower 27a tracking the peripheral surface of a disc-shaped steering cam 28. The shaft 29 for the steering cam 28 is mounted in bearing members (not specifically shown) depending from the frame 23. The cam 28 receives torque from a belt drive including a first pulley 55a coaxial with and secured to the shaft 29, a second pulley 55 on a downwardly extending bracket 23b of the frame 23, and an endless belt 55b which is trained over the pulleys 55, 55a.

Each of the rails 26 can be said to constitute a pivotable first carrier and each of these rails supports a reciprocable second carrier 30. The two carriers 30 are connected to each other by the holder 4. The latter further supports a lever 31 one end of which is integral with or rigidly connected to the aforementioned bearing member 9 for the support 2. The other end of the lever 31 carries a roller follower 32 which extends into a guide slot 33 provided in a plate-like carriage or slide 34. The latter has aligned horizontal slots 35 and 36 for guide pins or rollers 37 and 38 so that the carriage 34 can move horizontally back and forth, as viewed in FIG. 2, through distances corresponding to the length of the slot 35 or 36 minus the diameter of the respective guide pin 37 or 38. These guide pins are mounted on a horizontal bar 39 which is secured to the frame 23.

FIG. 2 further shows one of the blocks 5 for the respective suction cup 6 and the wiper 8 on the illustrated block 5. The suction cup 6 of FIG. 2 is located behind the illustrated side wall 3 of the holder 4.

The camshaft 29 carries and rotates a second steering cam 40 which is located behind the carriage 34, as viewed in FIG. 2. That side of the carriage 34 which faces away from the observer of FIG. 2 supports a roller follower 41 extending into the endless groove 42 of the steering cam 40.

The cam 28 steers the rails or carriers 26 of the moving means for the suction cups 6 by causing or allowing such rails to pivot about the common axis of the pivot members 25 in response to rotation of the camshaft 29. The cam 40 steers the carriers 30 of the moving means for the suction cups 6 by causing the carriers 30 to move lengthwise of the rails 26 in response to rotation of the camshaft 29.

Figure 3:
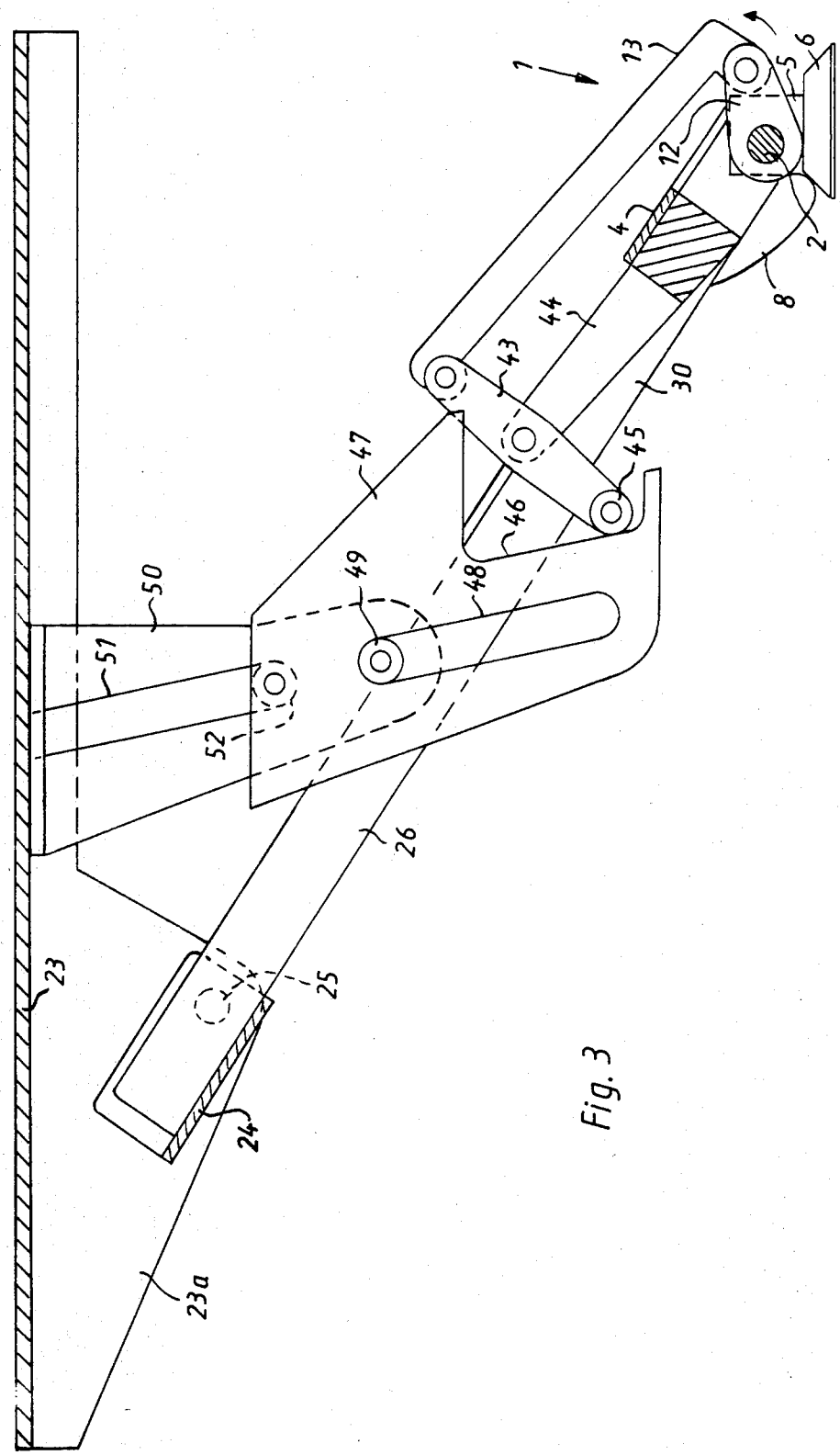
FIG. 3 is a similar enlarged fragmentary longitudinal vertical sectional view as seen in the direction of arrows from the line III—III of FIG. 1.

FIG. 3 is a sectional view in a plane which is parallel to that of FIG. 2. This Figure shows the means for changing the angular positions of the suction cups 6. As already mentioned in connection with FIG. 1, the support 2 can be rotated about its own axis by the crank arm 12 and pull rod 13 one end of which is pivotally connected to the crank arm. The other end of the pull rod 13 is articulately connected to one arm of a two-armed rocking lever 43 which is pivotable on an extension 44 of the holder 4 and the other arm of which is provided with a roller follower 45. The latter tracks the rocking cam 46 of a second slide or carriage 47 which is provided with an inclined guide slot 48 for a roller-shaped wiper 49 secured to an upright bracket 50 which is mounted on or forms part of the frame 23. The bracket 50 is formed with an elongated slot 51 which is in register with the slot 48 of the carriage 47 and receives a roller follower 52 of the carriage 47.

Figure 4:
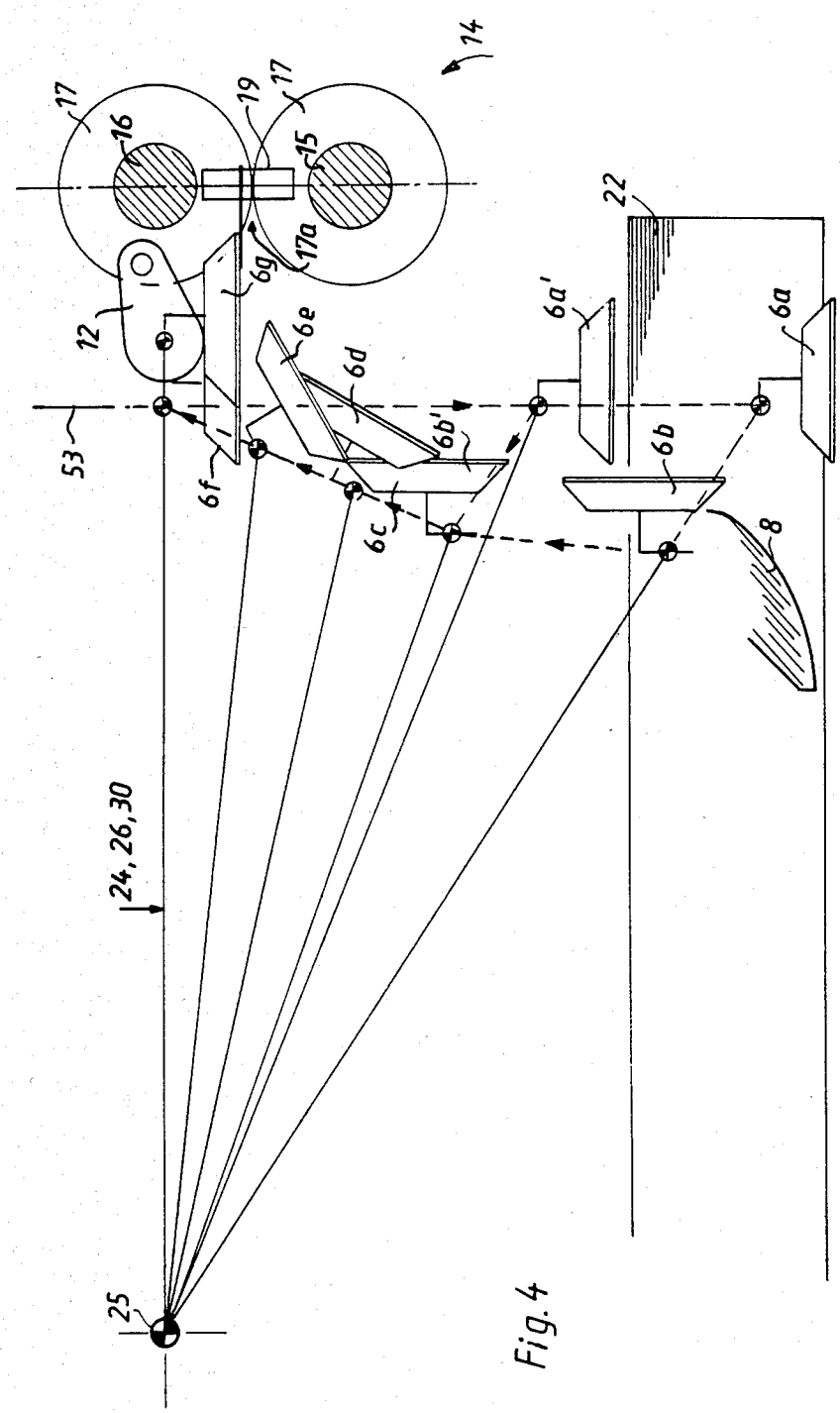
FIG. 4 is a partly schematic enlarged longitudinal vertical sectional view substantially as seen in the direction of arrows from the line IV—IV of FIG. 4, showing one of the lifting elements in two end positions as well as in several intermediate positions.

The mode of operation of the improved apparatus will be described with reference to FIG. 4. The purpose of the cam 28 is to pivot the lever 27 which carries the roller follower 27a and which, in turn, changes the angular positions of the carriers or rails 26 as a function of the angular position of the cam 28. The purpose of the cam 40 is to shift the carriage 34 along a horizontal path which is defined by the guide slots 35, 36 and guide pins 37, 38. The slot 33 guides the roller follower 32 in order to move the carriers 30 lengthwise of the respective rails 26. The carriers 30 are slidably telescoped into the respective rails 26. The just described structure can cause the suction cups 6 to perform movements which are shown in FIG. 4. Thus, the suction cups 6 are first pivoted through angles of approximately 90° from the end positions 6a to the intermediate positions 6b or from the end positions 6a' to the intermediate positions 6b' while they adhere to the leader of the outermost sheet of the stack (e.g., the narrower stack 22) therebelow. The roller follower 45 of the two-armed lever 43 tracks the rocking cam 46 of the carriage 47 to thereby turn the support 2 and the suction cups 6 in response to movement of the carriage 47 with reference to the bracket 50 as a result of pivoting of the rails 26 and movement of the carriers 30. In other words, the motion to turn the suction cups 6 about the axis of the support 2 is derived indirectly as a result of pivoting of the lever 43 under the action of the rocking cam 46 on the carriage 47 and as a result of movement of the carriage 47 relative to the frame 23 and its bracket 50 in response to pivoting of the parts 26, 30 about the axis which is defined by the pivot members 25 as well as in response to lengthwise movement of carriers 30 relative to the corresponding carriers or rails 26.

If the apparatus is started while certain of its parts assume the positions which are shown in FIG. 2, the cams 28 and 40 rotate in a clockwise direction and the carriage 34 moves in a direction to the left. This retracts or telescopes the carriers 30 into the respective rails 26. Since the roller follower 45 engages the rocking cam 46 of the carriage 47, retraction of the carriers 30 into the respective rails 26 (i.e., a shortening of the distance between the support 2 and the pivot members 25) causes the suction cups 6 to move counterclockwise about the axis of the support 2. The lever 43 causes the crank arm 12 to turn counterclockwise through an angle of approximately 90° while the suction cups 6 adhere to the upper side of the leader of the topmost or outermost sheet of the stack 22 in the tray 20 so that such leader is turned or folded through 90° and becomes separated from the leader of the sheet therebelow. Predictable angular displacement of the suction cups 6 is assisted by the wipers 8 whose convex faces abut against the upper side of the topmost sheet of the stack 22 behind the suction cups 6 and such wipers roll on the stack 22 while the suction cups 6 fold the leader through an angle of approximately or exactly 90° into a plane which is at least substantially normal to the plane of the topmost sheet of the stack 22 prior to lifting of its leader and which is also normal or substantially normal to the horizontal plane including the nips 17a of the two pairs of advancing rolls 17 forming part of the transporting device 14.

Referring more specifically to FIG. 4, the suction cups 6 assume the first end positions 6a if the stack in the tray 20 is low or very low, e.g., when the supply of sheets forming the stack 22 is nearly exhausted, and the suction cups 6 then assume the intermediate positions 6b in response to rotation of the support 2 through 90°. On the other hand, if the stack 2 is as tall as shown in FIG.

4, the first end positions of the suction cups 6 are those shown at or close to 6a' and the intermediate positions after turning counterclockwise through 90° are shown at 6b'. As the belt 55b continues to rotate the camshaft 29 in a clockwise direction, as viewed in FIG. 2, the rails 26 pivot counterclockwise and move the support 2 for the suction cups 6 (in the angular positions 6b or 6b') vertically upwardly until the rails 26 are horizontal or nearly horizontal. During the initial stage of upward movement of the support 2, the angular positions of the suction cups 6 need not change at all, i.e., such suction cups can retain the orientation corresponding to that shown at 6b or 6b' in FIG. 4. This results in lifting of the suctionally engaged leader of the topmost sheet of the stack 22 while the leader is located in a plane making an angle of 90° with the plane of the next outermost sheet of the stack 22.

During the last stage of pivotal movement of the rails 26 in a counterclockwise direction, as viewed in FIG. 2, the carriage 34 begins to move in a direction to the right under the action of the cam 40. This disengages the follower 45 of the lever 43 from the rocking cam 46 of the carriage 47 so that the spring 10 can turn the crank arm 12 clockwise and the suction cups 6 move the lifted leader of the topmost sheet of the stack 22 into a horizontal plane which includes the nips 17a of the two pairs of advancing rolls 17. Certain additional intermediate positions of the suction cups 6 are shown in FIG. 4 at 6c, 6d and 6e. When the suction cups 6 reach the second end positions 6f, the leader of the lifted sheet is located in the just mentioned horizontal plane including the nips 17a. The intermediate positions 6c of the suction cups 6 moving from the end positions 6a can correspond to the intermediate positions 6b' of suction cups moving from the first end positions 6a'.

When the suction cups 6 reach the second end positions 6f, the carriage 34 continues to move in a direction to the right so that the suction cups 6 move to the positions 6g without any change of orientation (it is the same as in the second end positions 6f) whereby the front edge of the lifted leader is inserted into the nips 17a of the two pairs of advancing rolls 17 which are driven to advance the sheet in a direction away from the observer of FIG. 1 and at right angles to the plane of the drawing.

In the next step, the carriage 34 moves to the left so that the suction cups 6 are returned (from the positions 6g) to the second end positions 6f. At such time, the roller follower 27a of the lever 27 (which determines the angular positions of the rails 26) reaches the tip 28a of the lobe of the cam 28 whereby the rails 26 are free to pivot downwardly by gravity (i.e., in a clockwise direction, as viewed in FIG. 2). The carriage 34 is then at a standstill and the roller follower 32 slides in the slot 33 downwardly at a predetermined angle which is given by the inclination of the slot 33 with reference to the vertical so that the carriers 30 slide relative to the respective rails 26 to move the support 2 away from the common axis of the pivot members 25 for the rails 26. This ensures that the axis of the support 2 descends along a vertical path which is indicated in FIG. 4 by the vertical phantom line 53 with the result that the suction cups 6 (in the positions 6a or 6a') invariably engage the outer side of the leader of the topmost sheet of the stack 22 at a fixed distance from the front edge face of such stack. This is highly desirable because such mode of lowering the suction cups 6 ensures that the leading edge of each and every lifted leader invariably enters the nips 17a of the advancing rolls 17 when the suction cups 6 move from the second end positions 6f to the positions 6g in response to rightward movement of the carriage 34. The roller follower 45 of the two-armed lever 43 and the cam 46 of the carriage 47 ensure that the orientation of the suction cups 6 is always the same when such suction cups reach the first end positions 6a or 6a'. The engagement between the roller follower 45 and the cam 46 entails a slight angular movement of the support 2 in a counterclockwise direction.

FIG. 5 illustrates the electrical and electronic controls of the improved apparatus. A control circuit 54 has a first input a which is connected with a signal transmitting conductor 64 serving to transmit signals which initiate the operation of the apparatus. A first output f of the circuit 54 is connected with a motor 155 which drives the pulley 55 and hence the camshaft 29. A second output g of the circuit 54 transmits signals to the motor of the transporting device 14 so that such motor drives the shaft 15 and/or 16, i.e., the upper rolls 17 then rotate counterclockwise and the lower rolls 17 rotate clockwise, as viewed in FIG. 4. A third output h of the control circuit 54 transmits signals to the suction pump 56 so that the latter can exhaust air from the chambers of the suction cups 6, and a fourth output i is connected with the solenoid of a normally closed aerating valve 57 which can connect the chambers of the suction cups 6 with the atmosphere so that the suction cups cease to adhere to the upper side of the leader of a sheet.

The shaft 155a of the motor 155 carries slotted discs or wheels 58 and 59 which cooperate with photoelectric detectors 60 and 61, respectively. A further photoelectric detector 62 monitors the angular position of an actuator or trip 63 which turns with the rails 26 of the moving means for the suction cups 6. The inputs b, c, d and e of the control circuit 54 are respectively connected with the photoelectronic transducers of the detectors 61, 60, 62 and 19.

When the input a of the control circuit 54 receives a "start" signal via conductor means 64, it initiates the transfer of a sheet from the top of the stack 22 to the transporting device 14. In the first step, the output f of the control circuit 54 transmits a signal to start the motor 155, and the output h transmits a signal to start the suction pump 56. The detector 62 transmits a signal when the rails 26 assume predetermined angular positions denoting that the suction cups 6 are ready to attract the leader of the topmost sheet of the stack 22. The signal which the detector 62 transmits to the input d of the control circuit 54 entails a temporary stoppage of the motor 155 in response to transmission of a signal via output f, and the control circuit 54 then ascertains whether or not suction in the cups 6 suffices to properly attract the leader of the topmost sheet of the stack 22. If the circuit 54 determines that the suction is satisfactory, the motor 155 is started again whereby the leader of the topmost sheet of the stack 22 is bent counterclockwise and through approximately 90°, as viewed in FIG. 4. The detector 60 then transmits a signal to the input c to indicate that the suction cups 6 have assumed the intermediate positions 6b or 6b', depending on the height of the stack in the tray 20. The signal from the detector 60 to the corresponding input c of the control circuit 54 entails a short-lasting stoppage of the motor 155 in order to ensure that the leader of the second sheet invariably becomes separated from the flexed leader of the topmost sheet. In other words, the motor 155 then allots a certain interval of time which can be of advantage if the leader of the next-to-the-topmost sheet continues to adhere to the leader of the topmost sheet while the leader of the topmost sheet shares the angular movement of the suction cups 6 from the first end positions 6a or 6a' to the intermediate positions 6b or 6b'.

After elapse of the just discussed interval (which can be selected by the operator in dependency on the flexibility of sheets in the stack 22, on the tendency of sheets to adhere to each other for other reasons and/or other factors which influence cohesion between the neighboring sheets of the stack 22), the control circuit 54 starts the motor 155 as well as the motor of the transporting device 14. The motor 155 causes the cams 28 and 40 on the camshaft 29 to move the suction cups 6 through the intermediate positions 6c, 6d, 6e to the second end positions 6f and thence to the end positions 6g. The leading edge of the leader in the nips 17a of the advancing rolls 17 is then detected by the detector 19 which transmits a signal to the input e of the control circuit 54 whereby the latter rapidly arrests the motor of the transporting device 14, the motor 155 and the motor for the pump 56 while simultaneously opening the aerating valve 57 so that the suction cups 6 are rapidly separated from the leader of the lifted topmost sheet while such leader is properly held by the two pairs of advancing rolls 17. The motor of the transporting device 14 is thereupon restarted after a relatively short delay which suffices to reliably disengage the suction cups 6 (in the positions 6g) from the adjacent sheet so that the device 14 can advance the thus released sheet to the next station, not shown. The detector 19 transmits a second signal when it detects the trailing edge of the sheet in the transporting device 14, and such second signal initiates stoppage of the motor of the transporting device 14, either immediately or with a requisite delay. The control circuit 54 starts the motor 155 simultaneously with stoppage of the motor of the transporting device 14 so that the shaft 155a rotates the wheel 59 until the detector 61 transmits a signal denoting that all parts of the apparatus are back in their starting positions. The signal which is transmitted by the detector 61 causes the control circuit 54 to arrest the motor 155, and the apparatus then remains idle until the input a receives a fresh start signal via conductor means 64.

Figure 6:
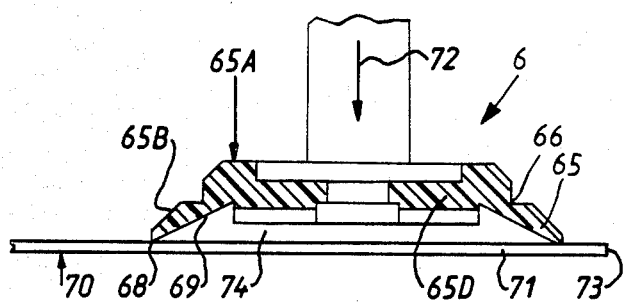
FIG. 6 is an enlarged axial sectional view of a presently preferred lifting element.

FIG. 6 illustrates a suction head 6 which can be used with advantage in the apparatus of the present invention. This suction head comprises a pronounced bell 65A with a circumferential sealing lip 65 which extends forwardly and is first to come in contact with the surface of a sheet. The bell 65A of the suction cup 6 consists of preferably elastically deformable material, and its frustoconical external surface 65B has a circumferentially complete triangular notch 66 which allows for flexing of the lip 65 with reference to the central portion 65D of the bell 65A. This ensures that the original linear or quasi linear contact between the lip 65 and a sheet therebelow is converted into a substantial surface-to-surface contact. Thus, the initial contact between the lip 65 and the upper side of the leader 71 of a sheet 70 therebelow takes place along a circular line 68, but such contact is greatly increased when the suction cup 6 is moved axially (arrow 72) so that the upper side of the leader 71 of the sheet 70 is engaged by the relatively wide internal surface 69 of the lip 65. The character 74 denotes the suction chamber of the cup 6.

An important advantage of the improved apparatus is that the suction cups 6 can engage the leader 71 of the outermost sheet 70 of a stack (e.g., the stack 22) at a predetermined distance from the leading edge 73 of the leader irrespective of the height of the stack. Moreover, the improved apparatus is particularly suited for the manipulation of certain types of sheets, such as X-ray films. Thus, and if the stack 21 or 22 contains a supply of overlapping or superimposed X-ray films, such films are not exposed in response to pressure which is applied thereto by the suction cups 6 because the pressure is insufficient to entail a pressure-induced exposure. Still further, the aforediscussed mode of changing the orientation of suction cups 6 during lifting of the leader 71 of the outermost sheet 70 ensures that the outermost sheet is not shifted relative to the sheet therebelow during the initial stage of separation, namely, during movement of the suction cups 6 from the first end positions 6a to the intermediate positions 6b or from the first-end positions 6a' to the intermediate positions 6b' (FIG. 4), i.e., while the leader of a film is flexed from the plane of the remainder of such sheet into a plane which is at least substantially normal to the planes of sheets forming the stack. It has been found that the improved apparatus can readily manipulate all formats of sheets, including several odd or unusual shapes such as X-ray films which are very wide, as considered in the axial direction of the advancing rolls 17, but are short or very short, as considered in a direction at right angles to the axes of the rolls 17, i.e., X-ray films which exhibit negligible resistance to transverse flexing. The aforedescribed transporting device 14 is capable of properly accepting, advancing and guiding sheets whose width greatly exceeds the distance between the two suction cups 6. The transporting device 14 can accept all sheets which exhibit sufficient resistance to gravitational flexing to ensure that their leading edge enters the nips 17a as well as the undulate passage between the additional rolls 18 when the leader 71 of the sheet is attracted by the suction cups 6 and the suction cups advance from the first end positions 6a or 6a' to the positions 6g. Thus, all that is necessary is to ensure that, when the suction cups 6 lift the leader of a sheet which forms part of the wide stack 21 shown in FIG. 1, the right-hand portion of the leading edge of such sheet enters the passage between the upper and lower additional rolls 18 and comes to rest on the lower rolls 18 while the suction cups 6 advance the left-hand portion of such leading edge into the nips 17a of the two pairs of advancing rolls 17.

The width of the widest sheets which can be handled by the improved apparatus can be more than twice the width of the narrowest sheets which can be properly attracted by the suction cups 6. The stiffness of the relatively wide sheets is greatly increased as a result of flexing of their leaders in the aforedescribed manner so that such sheets can properly enter the transporting device even if the suction cups attract only their left-hand halves, as viewed in FIG. 1. The flexing of the leading edge of a sheet which has been lifted is terminated immediately before the sheet is released by the suction cups 6, namely, when the non-attracted part of the leader of the lifted sheet rests on the lower additional rolls 18. The driven rolls 17 are then capable of properly advancing the sheet through the transporting device 14 irrespective of the width of the sheet because the sheet portion which advances between the upper and lower additional rolls 18 is properly guided even though it is not or it need not be positively engaged by driven advancing rolls.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. Apparatus for transferring sheets, particularly X-ray films, from a stack of overlapping sheets to an inlet of a transporting device which accepts the sheets in a first plane, each sheet including a leader having one of a plurality of widths greater than or equal to a minimum width, and each sheet also including an edge which extends transversely of the leader, said apparatus comprising:
   (a) a source of sheets arranged to support the stack so that the outermost sheet is located in a second plane which is at least substantially parallel to said first plane, said source being further arranged to support the stack such that the leaders are substantially superimposed and the edges are substantially in alignment;
   (b) a singularizing device including a pair of suction-operated, mobile lifting elements separated from one another in a predetermined direction by a spacing which at most equals said minimum width, said singularizing device being devoid of lifting elements to the outside of said pair as considered along said predetermined direction;
   (c) means for moving said lifting elements into engagement with the leader of the outermost sheet so that one of said lifting elements is in the region of the respective edge and said spacing extends along the leader of the outermost sheet; and
   (d) means for steering the movements of said lifting elements between a first end position in which the latter engage the leader of the outermost sheet in said second plane, and a second end position adjacent to said inlet in which the leader is located substantially in said first plane, said steering means being designed such that said lifting elements bend at least a portion of the leader out of parallelism with said planes as said lifting elements begin to move from said first end position towards said second end position, and said steering means being further designed such that said lifting elements maintain the bent portion of the leader out of parallelism with said planes until arrival of said lifting elements at said second end position.

2. The apparatus of claim 1, wherein said moving means comprises means for pivoting said lifting elements about a predetermined axis.

3. The apparatus of claim 1, wherein said steering means comprises at least one cam.

4. The apparatus of claim 1, wherein said first and second planes are at least substantially horizontal.

5. The apparatus of claim 1, wherein said transporting device includes at least one pair of sheet advancing rolls defining a nip which is located in said first plane.

6. The apparatus of claim 1, wherein said steering means is designed such that said lifting elements bend the leader through an angle of at least approximately 90°.

7. The apparatus of claim 1, wherein said first and second planes are substantially horizontal and said second plane is located below said first plane, said steering means being arranged to effect substantially vertical movement of said lifting elements between the levels of said first and second planes.

8. The apparatus of claim 1, wherein said moving means includes a first carrier, means defining a pivot axis for said carrier, and a second carrier supported by said first carrier for radial movement with reference to said axis under the action of said steering means, said lifting elements being mounted on said second carrier.

9. The apparatus of claim 8, wherein one of said carriers is slidably telescoped into the other of said carriers.

10. The apparatus of claim 8, wherein said first carrier comprises a plurality of elongated rails and said steering means includes cam means for pivoting said rails about said axis.

11. The apparatus of claim 10, wherein said steering means further comprises additional cam means for moving said second carrier with reference to said rails.

12. The apparatus of claim 1, wherein said moving means comprises a common support for said lifting elements, said support defining a pivot axis for said lifting elements, and said steering means including means for pivoting said lifting elements about said axis.

13. The apparatus of claim 12, wherein said pivoting means includes crank means connected to said support and means for rocking said crank means to thereby pivot the lifting elements about said axis through the medium of said support.

14. The apparatus of claim 13, wherein said rocking means comprises cam means.

15. The apparatus of claim 13, wherein said moving means further comprises a first carrier pivotable about a second axis, and a second carrier supported by said first carrier for movement radially of said second axis, said second carrier including two spaced-apart portions, and said support being mounted on such portions of said second carrier.

16. The apparatus of claim 15, wherein said portions of said second carrier have ends remote from said second axis and said support is mounted on the ends of such portions.

17. The apparatus of claim 1, further comprising control means for said steering means and said singularizing device.

18. The apparatus of claim 17, wherein said lifting elements have suction chambers and said singularizing device further comprises suction generating means activatable to draw air from said suction chambers and aerating means activatable to admit air into said chambers, said control means including means for activating and deactivating said suction generating means and said aerating means.

19. The apparatus of claim 1, wherein said source includes a bottom wall having holes in register with said lifting elements in the first end positions of such lifting elements.

20. The apparatus of claim 1, wherein each of said lifting elements comprises a deformable bell having a conical external surface and a circumferentially extending notch in said external surface.

21. The apparatus of claim 20, wherein said notch has a substantially triangular cross-sectional outline.

22. The apparatus of claim 1, comprising wiper means adjacent to at least one of said lifting elements and arranged to roll along the exposed side of the outermost sheet during movement of said lifting elements from said first end positions.

23. The apparatus of claim 22, wherein said wiper means has a convex sheet-contacting surface and said lifting elements are arranged to turn about a predetermined axis to thereby flex the leader of the outermost sheet during movement of said lifting elements from their first end positions.

24. The apparatus of claim 17, wherein said steering means comprises at least one rotary cam, and motor means for said cam, said control means including means for arresting said motor means for a given interval of time during movement of said lifting elements from said first end position to said second end position.

25. The apparatus of claim 17, comprising sensing means operative to transmit a signal to said control means when said lifting elements assume said first end position, said signal causing said control means to arrest said steering means while ascertaining whether said lifting elements have sufficient suction to bend the leader out of said second plane.

26. The apparatus of claim 25, wherein said sensing means comprises a photoelectric detector.

27. The apparatus of claim 25, wherein said sensing means comprises an actuating element on said moving means, and a detector for sensing the angular position of said actuating element.

28. The apparatus of claim 17, comprising sensing means operative to transmit a signal to said control means when said lifting elements have bent the leader to a predetermined angle, said signal causing said control means to arrest said steering means so as to permit any sheets adhering to the outermost sheet to separate from the latter.

29. The apparatus of claim 28, wherein said sensing means comprises a photoelectric detector.

30. The apparatus of claim 28, wherein said sensing means comprises a slotted disc arranged to rotate in response to activation of said steering means, and a detector for sensing a slot in said disc.

31. The apparatus of claim 17, said steering means being designed to effect movement of said lifting elements from said second end position to a standby position after entry of the outermost sheet into said transporting device; and further comprising sensing means operative to transmit a signal to said control means when said lifting elements assume said standby position, said signal causing said control means to arrest said steering means.

32. The apparatus of claim 31, wherein said sensing means comprises a photoelectric detector.

33. The apparatus of claim 31, wherein said sensing means comprises a slotted disc arranged to rotate in response to activation of said steering means, and a detector for sensing a slot in said disc.

34. The apparatus of claim 17, said singularizing device including suction generating means for creating suction in said lifting elements, and aerating means for eliminating suction in said lifting elements, and said control means being further arranged to control said transporting device; and further comprising sensing means operative to transmit a signal to said control means upon arrival of the leader at said inlet of said transporting device, said signal causing said control means to deactivate said suction generating means and to activate said aerating means so as to release the leader from said lifting elements, and said signal further causing said control means to arrest said steering means and said transporting device, said control means being designed to restart said transporting device after release of the leader from said lifting elements.

35. The apparatus of claim 34, said sensing means being operative to transmit another signal to said control means upon arrival of the trailing end of the outermost sheet at said inlet of said transporting device; and wherein said control means is designed to arrest said transporting device in response to said other signal.

36. The apparatus of claim 34, said sensing means being operative to transmit another signal to said control means upon arrival of the trailing end of the outermost sheet at said inlet of said transporting device; and wherein said control means is designed to restart said steering means in response to said other signal, said steering means being arranged to thereupon cause movement of said lifting elements to a standby position.

37. The apparatus of claim 34, wherein said sensing means comprises a photoelectric detector.

38. Apparatus for transferring successive outermost sheets of a stack of overlapping sheets having one of a plurality of different widths including a minimum width to a transporting device which accepts successive sheets in a first plane, particularly for transferring X-ray films, comprising a source of sheets arranged to support a stack of sheets so that the outermost sheet of the stack is located in a second plane which is at least substantially parallel to said first plane, the outermost sheet including a leader having an exposed side, and a width corresponding to one of said different widths; a singularizing device including a pair of suction-operated, mobile lifting elements spaced apart from one another by a distance which at most equals said minimum width; means for moving said lifting elements into engagement with the exposed side of the leader of the outermost sheet of the stack in said source; and means for steering the movements of said lifting elements between a first end position in which said lifting elements engage the outermost sheet of the stack in said second plane, a second end position in which the leader of the thus lifted outermost sheet is located in said first plane, and a plurality of intermediate positions in each of which the leader of the outermost sheet is disposed in at least one additional plane which is at least slightly inclined with reference to said first and second planes, said transporting device including at least one pair of advancing rolls defining a nip which is located in said first plane, and additional rolls which are staggered relative to one another, as considered in the axial direction of said advancing rolls, and define a path for a portion of a sheet whose width exceeds the distance between said lifting elements.

39. Apparatus for transferring successive outermost sheets of a stack of overlapping sheets having one of a plurality of different widths including a minimum width to a transporting device which accepts successive sheets in a first plane, particularly for transferring X-ray films, comprising a source of sheets arranged to support a stack of sheets so that the outermost sheet of the stack is located in a second plane which is at least substantially parallel to said first plane, the outermost sheet including a leader having an exposed side, and a width corresponding to one of said different widths; a singularizing device including a pair of suction-operated, mobile lifting elements spaced apart from one another by a distance which at most equals said minimum width, said lifting elements having suction chambers, and said singularizing device further including suction generating means operable to draw air from said suction chambers, and aerating means operable to admit air into said chambers; means for moving said lifting elements into engagement with the exposed side of the leader of the outermost sheet of the stack in said source; means for steering the movements of said lifting elements between a first end position in which said lifting elements engage the outermost sheet of the stack in said second plane, a second end position in which the leader of the thus lifted outermost sheet is located in said first plane, and a plurality of intermediate positions in each of which the leader of the outermost sheet is disposed in at least one additonal plane which is at least slightly inclined with reference to said first and second planes, said steering means including at least one rotary cam, and motor means for said cam; and control means for said steering means and said singularizing device, said control means including means for activating and deactivating said suction generating means and said aerating means, and said control means also including means for arresting said motor means for a given interval of time in said first end position of said lifting elements, and means for ascertaining the pressure in said suction chambers during said interval.

* * * * *